United States Patent
Andavarapu

(10) Patent No.: US 9,449,002 B2
(45) Date of Patent: Sep. 20, 2016

(54) SYSTEM AND METHOD TO RETRIEVE RELEVANT MULTIMEDIA CONTENT FOR A TRENDING TOPIC

(71) Applicant: Althea Systems and Software Pvt. Ltd, Bangalore (IN)

(72) Inventor: Sravan Kumar Andavarapu, Jeypore (IN)

(*) Notice: Subject to any disclaimer, the term of this patent is extended or adjusted under 35 U.S.C. 154(b) by 332 days.

(21) Appl. No.: 13/959,945

(22) Filed: Aug. 6, 2013

(65) Prior Publication Data

US 2014/0201240 A1   Jul. 17, 2014

(30) Foreign Application Priority Data

Jan. 16, 2013  (IN) .............................. 218/CHE/2013

(51) Int. Cl.
*G06F 7/00* (2006.01)
*G06F 17/30* (2006.01)

(52) U.S. Cl.
CPC .............................. *G06F 17/30023* (2013.01)

(58) Field of Classification Search
CPC ................... G06F 17/30861; G06F 17/30038; G06F 17/30023; G06F 17/30867
USPC ................. 707/706, 723, 767, 771
See application file for complete search history.

(56) References Cited

U.S. PATENT DOCUMENTS

| | | | |
|---|---|---|---|
| 2012/0179671 A1* | 7/2012 | Turner et al. | 707/723 |
| 2013/0007031 A1* | 1/2013 | Makino | H04N 5/76 707/758 |
| 2014/0074812 A1* | 3/2014 | Ruhela et al. | 707/706 |

* cited by examiner

*Primary Examiner* — Md. I Uddin
(74) *Attorney, Agent, or Firm* — Barry Choobin; Patent 360

(57) ABSTRACT

A system for identifying one or more multimedia content relevant to a trending topic is provided. The system includes a display unit, a memory unit that stores a set of modules and a database, and a processor that executes the set of modules. The set of modules include a query processing module, a content extracting module, a context extracting module, and a multimedia content identifying module. The query processing module processes a user input including a search query. The content extracting module extracts content which corresponds to the search query from a social medium. The context extracting module includes a) a keyword generating module obtains one or more generated keywords from the content, and b) a keyword qualifying module obtains one or more keywords from the one or more generated keywords. The multimedia content identifying module identifies the one or more multimedia content based on the one or more keywords.

9 Claims, 12 Drawing Sheets a) AAA: R.I.P Jeff Hanneman!  Sad news indeed! http://t.co/xxxxxxx #slayer b) BBB: RIP - #Slayer Guitarist Jeff Hanneman Dead at 49 (via @xxxxxxxxxx )

c) CCC: Slayer heavy metal guitarist dead 49 d) DDD: R.I.P Jeff Hanneman of Slayer http://t.co/xxxxxxx e) AAA: Listening to Slayer's Raining Blood. RIP Jeff Hanneman.

f) EEE: Slayer is devastated to inform that their bandmate and brother, Jeff Hanneman, passed away at about 11AM this...http://t.co/xxxxxxx g) FFF: Just found out Jeff Hanneman has passed away. What a sad day for us metal fans. He will truly be missed. My heart goes out to Kerry and co.

402

FIG. 4

| KEYWORDS | SCORE 504 |
|---|---|
| SLAYER | 43 |
| RIP | 20 |
| RETWEETFORRESPECT | 12 |
| DEAD | 11 |
| 49 | 5 |
| SLAAAAAAYER | 3 |
| GOLDENGODS | 2 |
| GODLISTENTOSLAYER | 2 |
| RIPJEFFHANNEMAN | 1 |
| SSSLLAAAYYYEERRRR | 1 |
| IDONTUNDERSTANDWHY | 1 |
| SLAYERDAY | 1 |
| METAL | 1 |
| DUCKS | 1 |

FIG. 5 a) his cover of Space Oddity by astronaut Chris Hadfield aboard the Int'l Space Station is fantastic: http://t.co/xxxxxxxx b) ISS Commander Chris Hadfield covers Bowie's Space Oddity as he prepares to leave ISS. Brilliant. http://t.co/xxxxxxxx c) We are looking for a more ASTRONAUT-LIKE name for CHRIS HADFIELD... What are your suggestions? (PS: Neil Armstrong...http://t.co/xxxxxx d) Space Oddity - Chris Hadfield performs onboard ISS with Larrivée Parlor: http://t.co/xxxxxx via @xxxxx e) Amazing and inspiring: Astronaut Chris Hadfield Performs David Bowie's "Space Oddity"... in Space http://t.co/xxxxxx via @xxxxxxxx

| KEYWORDS | NO. OF. OCCURRENCES 706 |
|---|---|
| SPACE (Space) | 48 |
| BOWIE | 31 |
| ODDITY | 30 |
| ASTRONAUT | 27 |
| DAVID | 23 |
| SPACE (space) | 21 |
| ISS | 17 |
| COMMANDER | 14 |
| EARTH | 12 |
| TWEETS | 10 |
| CANADIAN | 9 |
| SINGS | 8 |
| DE | 7 |

| KEYWORDS | SCORE |
|---|---|
| SPACE (Space) | 0.73 |
| BOWIE | 0.47 |
| ODDITY | 0.45 |
| ASTRONAUT | 0.41 |
| DAVID | 0.35 |
| SPACE (space) | 0.32 |
| ISS | 0.26 |
| COMMANDER | 0.21 |
| EARTH | 0.18 |
| TWEETS | 0.15 |
| CANADIAN | 0.13 |
| SINGS | 0.12 |
| DE | 0.1 |

SYSTEM AND METHOD TO RETRIEVE RELEVANT MULTIMEDIA CONTENT FOR A TRENDING TOPIC

CROSS-REFERENCE TO RELATED APPLICATIONS

This application claims priority to Indian patent application no. 218/CHE/2013 filed on Jan. 16, 2013, the complete disclosure of which, in its entirety, is herein incorporated by reference.

BACKGROUND

1. Technical Field

The embodiments herein generally relate to a system and method for identifying multimedia content that are associated with a trending topic, and more particularly, to a system and method for identifying multimedia content relevant to a trending topic based on an expanded query.

2. Description of the Related Art

A trending topic is a word, a phrase or a topic which is discussed or shared multiple times on a web. Multimedia content that are related to the trending topic would be off great interest to users. Typically, a user searches the internet with a word or a phrase related to the trending topic in order to retrieve multimedia content which are associated with the trending topic. However, multimedia content that are retrieved with such word or phrase are huge. Further, the multimedia content may not relate to a context associated with the trending topic, and hence it may not be relevant to the user.

For example, a user searches the internet with a word "XYZ" which is trending. A context associated with trending of the word 'XYZ' may include a US presidential election. The user may be interested in retrieving multimedia content that are related to the word "XYZ" in the context 'US presidential election'. However, a typical search system identifies multimedia content by matching the word 'XYZ' with existing multimedia content. The multimedia content that are identified may include content which are unrelated to the US presidential election, and hence the multimedia content may not be relevant to the user. Accordingly there remains a need for a system and method to identify multimedia content that are relevant to a trending topic.

SUMMARY

In view of the foregoing, an embodiment herein provides a system for identifying one or more multimedia content relevant to a trending topic. The system includes (i) a display unit, (ii) a memory unit that stores (a) a set of modules, and (b) a database, and (iii) a processor that executes the set of modules. The set of modules include i) a query processing module, and ii) a content extracting module. The query processing module executed by the processor that processes a user input including a search query. The search query is the trending topic. The content extracting module executed by the processor that extracts content which corresponds to the search query from a social medium. The set of modules further include (iii) a context extracting module and (iv) a multimedia content identifying module. The context extracting module includes a) a keyword generating module executed by the processor that obtains one or more generated keywords from the content, and b) a keyword qualifying module executed by the processor that obtains one or more keywords from the one or more generated keywords. The multimedia content identifying module executed by the processor that identifies the one or more multimedia content based on the one or more keywords from the one or more generated keywords.

The keyword qualifying module may further include a keyword prioritizing module executed by the processor that prioritizes the one or more generated keywords to obtain one or more prioritized keywords based on a score associated with each keyword of the one or more generated keywords. The score may be computed based on at least one of a) an affinity between each keyword occurring in the content and the trending topic, and b) a number of occurrences of each keyword in the content. The one or more keywords may be obtained from the one or more prioritized keywords, and may include a context associated with the trending topic. The set of modules may further include a query generating module executed by the processor that generates an expanded query with a) the search query, and b) the one or more keywords from the one or more generated keywords. The one or more multimedia content may be identified based on the expanded query.

In another aspect, a method for identifying one or more multimedia content relevant to a trending topic is provided. The method includes, (i) processing a user input including a search query, (ii) extracting content which corresponds to the search query from a social medium, (iii) identifying a context associated with the trending topic based on the content from the social medium, and (iv) identifying the one or more multimedia content relevant to the trending topic based on the context associated with the trending topic. The search query is the trending topic.

The method may further include, (v) obtaining one or more generated keywords from the content, and (vi) obtaining one or more keywords from one or more prioritized keywords. The one or more prioritized keywords may be obtained by prioritizing the one or more generated keywords based on a score associated with each keyword of the one or more generated keywords. The score may be computed based on at least one of a) an affinity between each keyword occurring in the content and the trending topic, and b) a number of occurrences of each keyword in the content. An expanded query may be generated with a) the search query, and b) the one or more keywords from the one or more prioritized keywords. The one or more multimedia content may be identified based on the expanded query.

In yet another aspect, a method for identifying one or more multimedia content relevant to a trending topic is provided. The method includes, (i) processing a user input including a search query, (ii) extracting content which corresponds to the search query from a social medium, (iii) obtaining one or more generated keywords from the content, and (iv) prioritizing the one or more generated keywords to obtain one or more prioritized keywords based on a score associated with each keyword of the one or more generated keywords. The score is computed based on at least one of a) an affinity between each keyword occurring in the content and the trending topic, and b) a number of occurrences of each keyword in the content. The method further includes, (iv) obtaining one or more keywords from the one or more prioritized keywords, and (v) identifying the one or more multimedia content relevant to the trending topic based on the one or more keywords from the one or more prioritized keywords.

The one or more keywords may include a context associated with the trending topic. An expanded query may be generated with a) the search query, and b) the one or more keywords from the one or more prioritized keywords. The one or more multimedia content may be identified based on the expanded query.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

With reference to the FIG. 3, FIG. 4 illustrates an exemplary view of an example content that is relevant to the trending topic "Jeff Hanneman" obtained from the social medium server according to one embodiment of the present disclosure.

FIG. 5 is a table view illustrating a list which includes one or more generated keywords from the content, and a corresponding score for each keyword, which is computed using the keyword scoring module of FIG. 2 according to one embodiment of the present disclosure.

With reference to FIG. 3.

FIG. 7 illustrates an exemplary view of an example content that is relevant to a trending topic "Chris Hadfield" obtained from the social medium server according to one embodiment of the present disclosure.

With reference to FIG. 7, FIG. 8 illustrates a list which includes one or more generated keywords from the content, and a number of occurrences of each keyword in the content computed using the keyword scoring module of FIG. 2 according to one embodiment of the present disclosure.

With reference to FIG. 8, FIG. 9 illustrates a score associated with each keyword of one or more generated keywords of the list computed based on an affinity between each keyword of the list, and the trending topic "Chris Hadfield" according to one embodiment of the present disclosure.

DETAILED DESCRIPTION OF PREFERRED EMBODIMENTS

Figure 1:
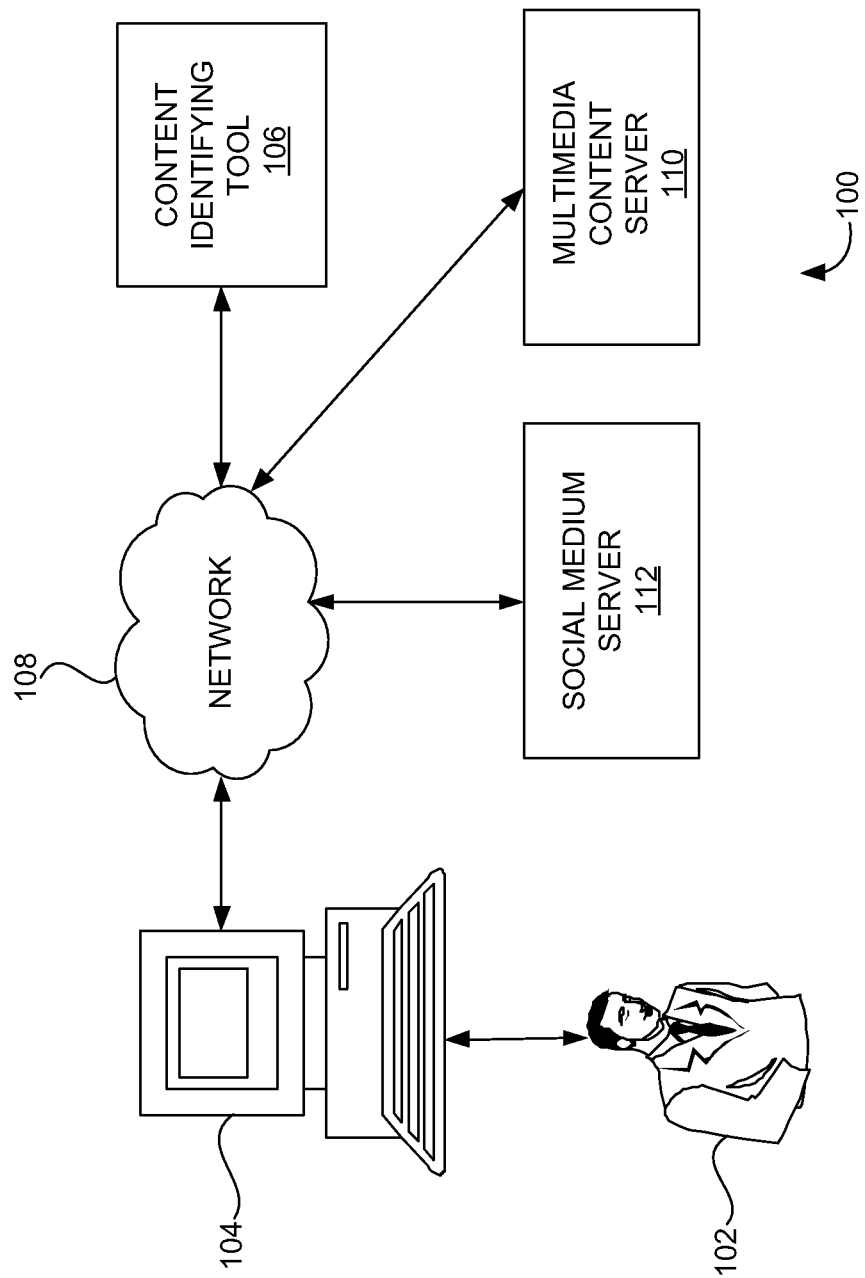
FIG. 1 illustrates a system view of a user communicating with a computing device by providing a search query to identify one or more multimedia content relevant to a trending topic, and a content identifying tool according to one embodiment of the present disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to identify multimedia content that are relevant to a trending topic. The embodiments herein achieve this by providing a content identifying tool that processes a user input including a search query which may be a trending topic. The content identifying tool extracts content which corresponds to the trending topic from a social medium, and qualifies one or more keywords from the content which indicate a context associated with the trending topic. The content identifying tool constructs an expanded query by combining the search query with the one or more keywords which indicate the context, and identifies one or more multimedia content relevant to the trending topic based on the expanded query. Referring now to FIGS. 1 through 12, where similar reference characters denote corresponding features consistently throughout the figures, preferred embodiments are described herein.

FIG. 1 illustrates a system view 100 of a user 102 communicating with a computing device 104 by providing a search query to identify one or more multimedia content relevant to a trending topic, and a content identifying tool 106 according to one embodiment of the present disclosure. The system view 100 further includes a network 108, a multimedia content server 110, and a social medium server 112. In one embodiment, the computing device 104 may be a smart device, a smart phone, a tablet PC, a laptop, a desktop, and an ultra book etc. In one embodiment, the search query itself a trending topic. In another embodiment, the search query includes at least one keyword that is related to a trending topic. When the user 102 provides a search query which includes a trending topic, the content identifying tool 106 processes the search query, and extracts content that are related to the trending topic from the social medium server 112 through the network 108. In one embodiment, the network 108 may be the internet, or a broadcast network. In one embodiment, the content pertaining to the trending topic is a real-time content.

The content identifying tool 106 further processes the content, and qualifies one or more keywords from the content to generate an expanded query. The one or more keywords provide a context which indicates a corresponding event associated with the trending topic, which in turn indicates a reason for sudden acceleration in search for the topic in the internet. The expanded query is generated with the search query and the one or more keywords from the content. The content identifying tool 106 identifies one or more multimedia content from a multimedia content server 110 through the network 108 based on the expanded query.

In one embodiment, the social medium server 112 includes content from one or more social medium (e.g., Twitter©, Facebook®, Google+®, MySpace™, Friendster® and LinkedIn®). In one embodiment, the multimedia content server 110 includes multimedia content that are obtained from one or more multimedia content providers (e.g., YouTube™, Scribd etc.).

Figure 2:
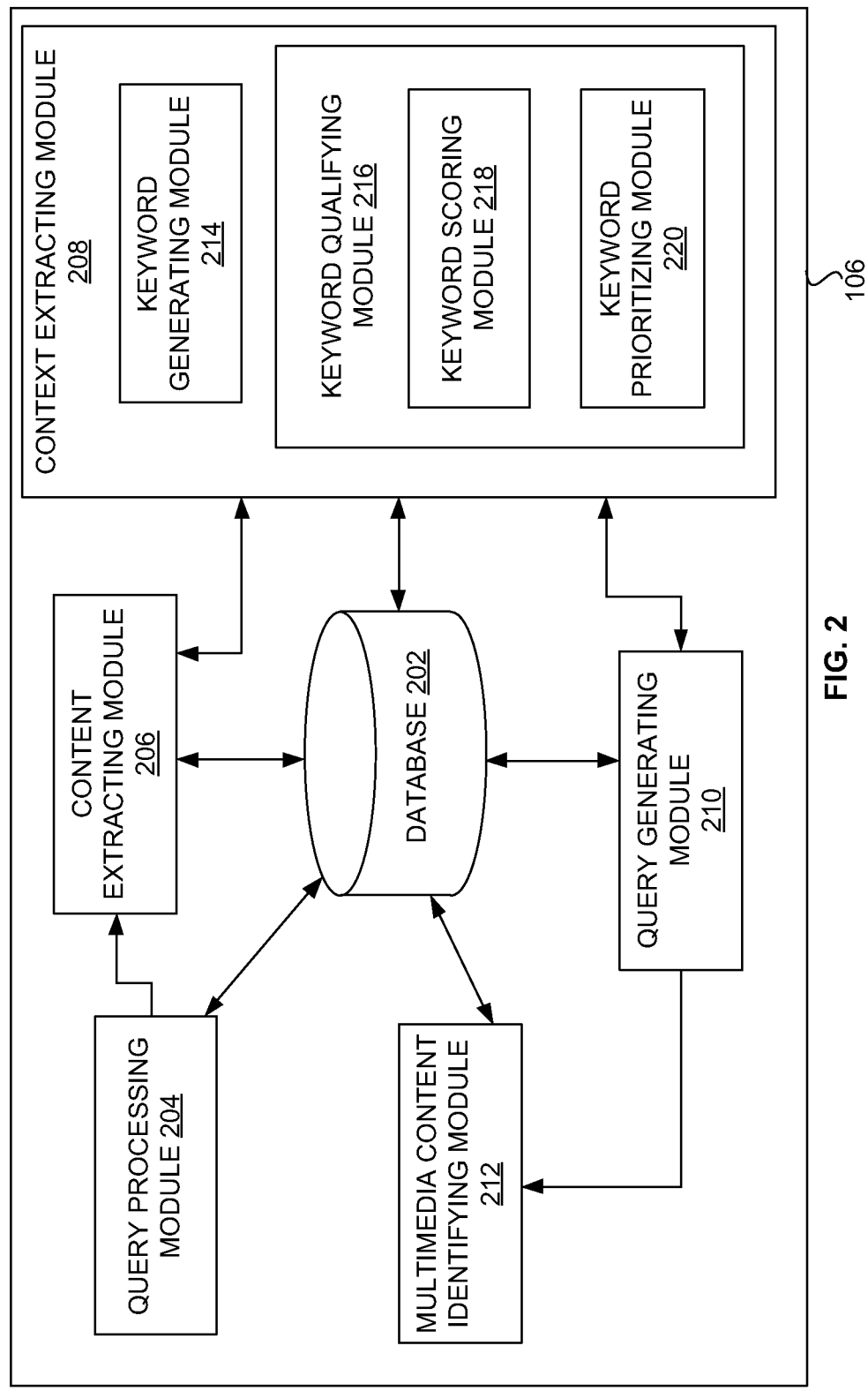
FIG. 2 illustrates an exploded view of the content identifying tool of FIG. 1 according to one embodiment of the present disclosure.

FIG. 2 illustrates an exploded view of the content identifying tool 106 of FIG. 1 according to one embodiment of the present disclosure. The content identifying tool 106 includes a database 202, a query processing module 204, a content extracting module 206, a context extracting module 208, a query generating module 210, and a multimedia content identifying module 212. The query processing module 204 processes a user input including a search query to identify one or more multimedia content relevant to a trending topic. In one embodiment, the search query includes the trending topic. The content extracting module 206 extracts content that are associated with the trending topic from the social medium server 112. In one embodiment, the content may include real-time update information (e.g., one or more events occurrence during a specific time period). The context extracting module 208 identifies and extracts a context associated with the trending topic from the content, which indicates a reason for a sudden acceleration in searching for the topic in the internet.

The context extracting module 208 includes a keyword generating module 214, and a keyword qualifying module 216. The keyword qualifying module 216 includes a keyword scoring module 218, and a keyword prioritizing module 220. The keyword generating module 214 generates and obtains one or more generated keywords by processing the content associated with the trending topic. Processing of the content may include removing stop words, and/or word delimiters from the content to obtain the one or more generated keywords in one embodiment. For example, the stop words include at, of, the, above, below, for etc. For example, the word delimiters may include comma (,), semicolon (;), quotes ("), and braces ({ }).

The keyword scoring module 218 computes a score for each keyword of the one or more generated keywords. In one embodiment, the keyword scoring module 218 computes a score for a keyword based on a number of occurrences of the keyword in the content. For instance, the one or more generated keywords that are obtained from the keyword generating module 214 include w1, w2, w3, and w4. A number of occurrences of each keyword in the content are identified. For example, a number of occurrences of a keyword w1 are t1, a number of occurrences of a keyword w2 are t2, a number of occurrences of a keyword w3 are t3, and a number of occurrences of a keyword w4 are t4. Then, in one embodiment, a score of the keyword w1 is t1, a score of the keyword w2 is t2, a score of the keyword w3 is t3, and a score of the keyword w4 is t4.

In another embodiment, the keyword scoring module 218 computes a score for each keyword of the one or more generated keywords, based on a technique includes, but not limited to, a correlation technique, a Jaccard coefficient technique, a Euclidean distance technique, etc. Any existing methods/techniques that are known in the art can be used for computing scores associated with keywords. In computing scores associated with the one or more generated keywords using the correlation technique and the Jaccard coefficient technique, a score associated with a keyword is computed based on an affinity between the keyword obtained from the content and a trending topic.

The keyword prioritizing module 220 prioritizes the one or more generated keywords to obtain one or more prioritized keywords based on corresponding score of each keyword of the one or more generated keywords. Further, a mean number of occurrences of each keyword in the content, and (ii) a standard deviation for number of occurrences of each keyword in the content may be computed. A threshold value may also be computed based on the mean number of occurrences, and the standard deviation for number of occurrences in accordance with an equation:

$$threshold = mean + A * standard\ deviation$$

where A is an integer constant. The integer constant 'A' is adjusted to qualify a number of keywords.

In one embodiment, the keyword qualifying module 216 qualifies one or more keywords from the one or more prioritized keywords based on a threshold value computed based on the above equation. For example, a more number of keywords are qualified when the integer constant 'A' set to be low. Similarly, a less number of keywords are qualified when the integer constant 'A' set to be high. In another example, when a threshold value is set to be 30, the keyword qualifying module 216 qualifies one or more keywords that have score equal to or more than 30. Further, the one or more keywords that are qualified from the content provide a context associated with the trending topic.

The query generating module 210 generates an expanded query by combining the search query which includes the trending topic, and one or more keywords that are qualified from the keyword qualifying module 216. The multimedia content identifying module 212 identifies and/or retrieves one or more multimedia content relevant to the trending topic from the multimedia content server 110 based on the expanded query.

Figure 3:
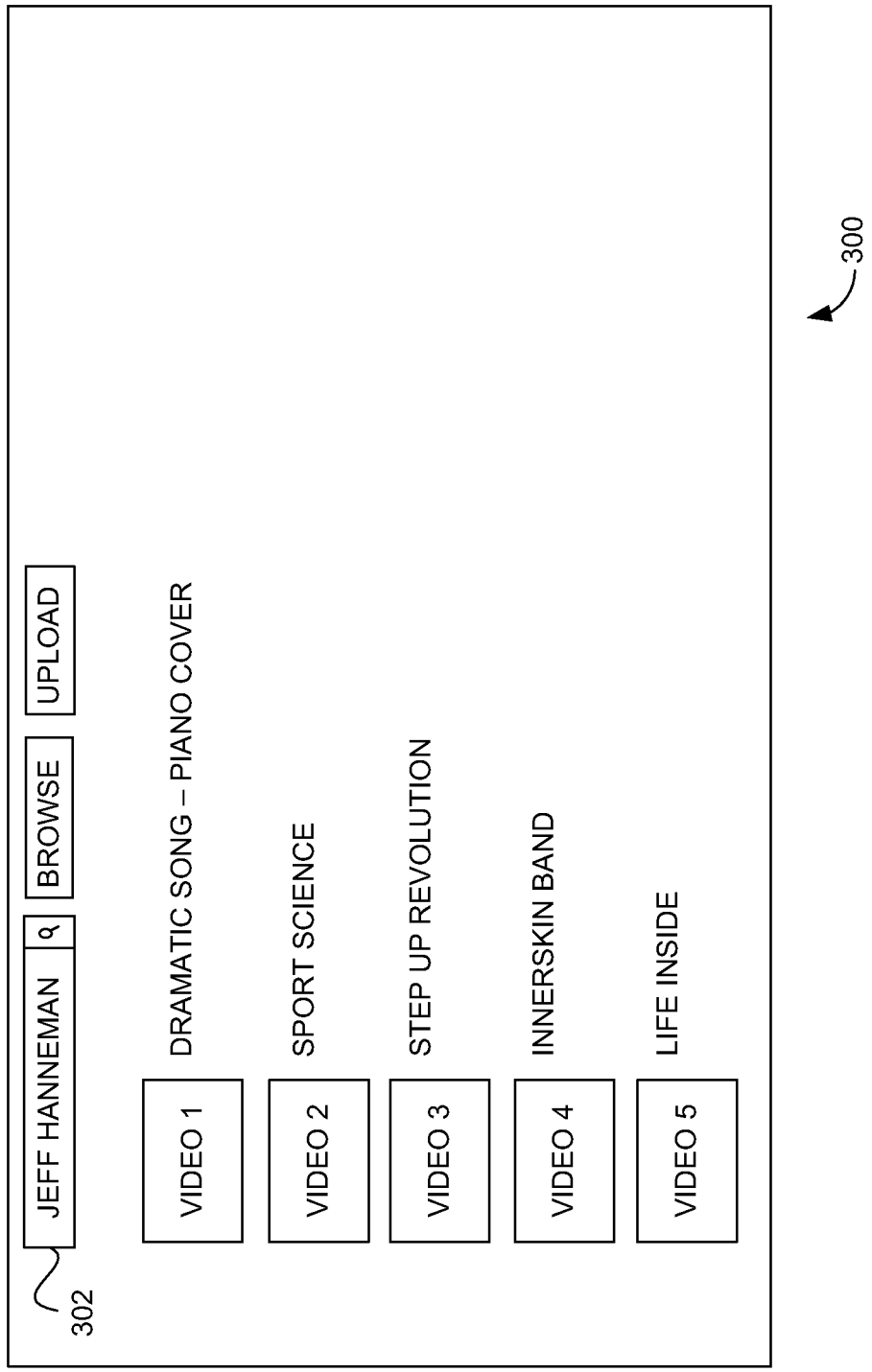
FIG. 3 illustrates a user interface view of a search page of the multimedia content server of FIG. 1 includes a search field in which the user inputs a search query to identify one or more multimedia content relevant to a trending topic according to one embodiment of the present disclosure.

FIG. 3 illustrates a user interface view 300 of a search page of the multimedia content server 112 of FIG. 1 includes a search field 302 in which the user 102 inputs a search query to identify one or more multimedia content relevant to a trending topic according to one embodiment of the present disclosure. As described above, in one embodiment, the search query is itself the trending topic. In another embodiment, the search query includes at least one keyword that is related to the trending topic. For example, when the user 102 intends to identify one or more multimedia content relevant to a trending topic "Jeff Hanneman", the user 102 may input a search query as "Jeff Hanneman" on the search field 302. Alternatively, the user 102 may input a search query as "Jeff Hanneman Album" which includes the trending topic "Jeff Hanneman".

With reference to the FIG. 3, FIG. 4 illustrates an exemplary view of an example content 402 that is relevant to the trending topic "Jeff Hanneman" obtained from the social medium server 112 according to one embodiment of the present disclosure. The content extracting module 206 identifies and extracts the content 402 from the social medium server 112 associated with a social medium (e.g., Twitter©, Facebook®, Google+®, MySpace™, Friendster® and LinkedIn®). The content 402 may be a user-generated content (e.g., micro blog posts, Twitter©. posts, Facebook® messages, etc) from the social medium. However, content related to a trending topic can also be obtained from articles published by news organizations, information from current events, web sites, or the like.

FIG. 5 is a table view 500 illustrating a list 502 which includes one or more generated keywords from the content 402, and a corresponding score 504 for each keyword, which is computed using the keyword scoring module 218 of FIG. 2 according to one embodiment of the present disclosure. The keyword generating module 214 processes the content 402, and obtains the one or more generated keywords. As described above, the processing may include removing stop words, and/or word delimiters from the content 402. In one embodiment, the keyword scoring module 218 computes a score for a keyword of the one or more generated keywords based on a number of occurrences of the keyword in the content 402. For example, when a number of occurrences of the keyword "slayer" in the content 402 are 43, the keyword scoring module 218 assigns a score associated with the keyword "slayer" as 43. Similarly, based on a number of occurrences of each keyword in the content 402, a corresponding score is computed as shown in the FIG. 5.

In another embodiment, the keyword scoring module 218 computes a score for each keyword of the one or more generated keywords from the content 402, based on a technique includes, but not limited to, a correlation technique, a Jaccard coefficient technique, a Euclidean distance technique, etc. In such techniques, a score associated with a keyword is computed based on an affinity between the keyword obtained from the content and a trending topic. The keyword prioritizing module 220 prioritizes the one or more generated keywords from the content 402 based on a corresponding score of each keyword to obtain a list which includes one or more prioritized keywords. As shown in the FIG. 5, the list 502 includes the one or more generated keywords which is already prioritized based on a corresponding score of each keyword. One or more keywords are qualified for generating an expanded query from the list 502 which includes one or more prioritized keywords as described below.

Figure 6:
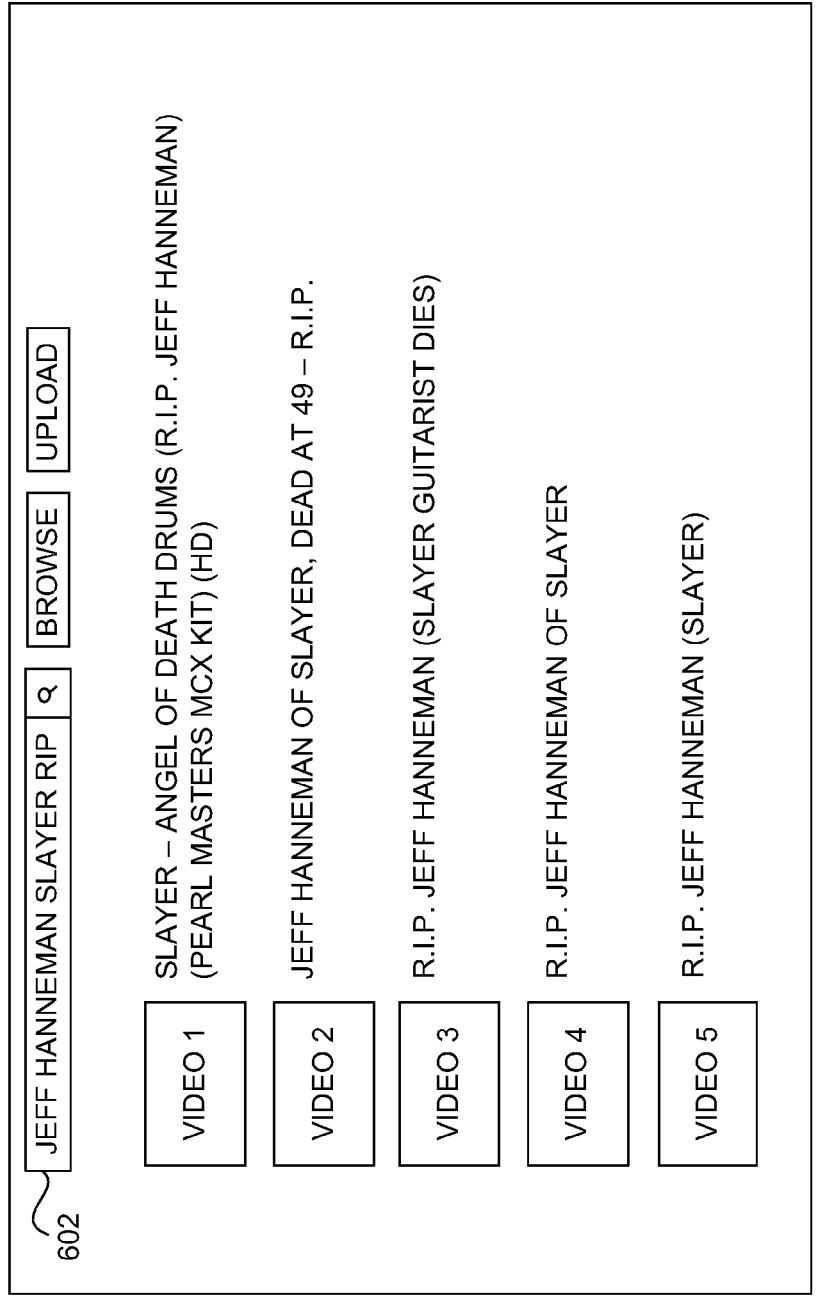
FIG. 6 illustrates the user interface view of the search page of the multimedia content server of FIG. 1 with an expanded query which includes the search query "Jeff Hanneman" and one or more keywords that are qualified based on a threshold value computed using the keyword qualifying module according to one embodiment of the present disclosure.

With reference to FIG. 3, FIG. 6 illustrates the user interface view 300 of the search page of the multimedia content server 112 of FIG. 1 with an expanded query 602 which includes the search query "Jeff Hanneman" and one or more keywords that are qualified based on a threshold value computed using the keyword qualifying module 216 according to one embodiment of the present disclosure. The content identifying tool 106 computes a mean number of occurrences of each keyword of the list 502 in the content 402. Further, the content identifying tool 106 computes a standard deviation for number of occurrences of each keyword of the list 502 in the content 402. A threshold value is computed based on computed mean number of occurrences and computed standard deviation. In one embodiment, a number of keywords that are qualified for generating the expanded query 602 may be obtained based on the threshold value. For example, a mean number of occurrences of each keyword of the list 502 in the content 402 is 7.43, a standard deviation for number of occurrences of each keyword of the list 502 in the content 402 is 11.3, and an integer constant 'A' is set to be 0.94, a corresponding threshold value can be computed as 7.43+0.94 (11.3) based on the above mentioned equation, which is approximately equal to 18. The keyword qualifying module 216 qualifies one or more keywords from the list 502 which have score equal to or more than 18. Examples of such keywords from the list 502 include "slayer" and "RIP". The query generating module 210 generates the expanded query 602 by combining the search query includes the keyword "Jeff Hanneman", and one or more keywords ("slayer" and "RIP") that are qualified using the keyword qualifying module 216. The multimedia content identifying module 212 identifies one or more multimedia content relevant to the trending topic "Jeff Hanneman" based on the expanded query 602 which includes the content "Jeff Hanneman slayer RIP".

A number of keywords that are to be qualified for generating the expanded query 602 can be adjusted based on the integer constant 'A'. For example, when a more number of keywords are to be qualified, then a value of the integer constant "A" can be set low. For example, when a value of the integer constant 'A' is set to 0.3, then a threshold value can be computed as 7.43+0.3 (11.3), which is approximately equal to 10.8. Based on the threshold value of 10.8, the keyword qualifying module 216 qualifies one or more keywords (e.g., "slayer", "RIP", "retweetforrespect", and "dead") from the list 502. Similarly, when a minimal number of keywords are to be qualified, then a value of the integer constant "A" can be set high. However, a person of ordinary skill in the art can employ other methods that are well known in the art for qualifying a number of keywords for generating an expanded query.

The one or more keywords that are qualified using the keyword qualifying module 216 provide a context associated with a trending topic. For example, a context associated with trending in the topic "Jeff Hanneman" includes, the guitarist was dead at the age of 49. One of the keyword "dead" from the list 502 provides a context associated with the trending topic "Jeff Hanneman". The content identifying tool 106 thus identifies a context associated with a trending topic, and identifies one or more multimedia content based on the context. Hence, the identified one or more multimedia content is relevant to the trending topic and to the user 102 who searches for such multimedia content.

FIG. 7 illustrates an exemplary view of an example content 702 that is relevant to a trending topic "Chris Hadfield" obtained from the social medium server 112 according to one embodiment of the present disclosure. FIG. 8 illustrates a list 704 which includes one or more generated keywords from the content 702, and a number of occurrences 706 of each keyword in the content 702 computed using the keyword scoring module 218 of FIG. 2 according to one embodiment of the present disclosure. The keyword generating module 214 processes the content 702, and obtains one or more generated keywords of the list 704 as described above. With reference to FIG. 8, FIG. 9 illustrates a score associated with each keyword of one or more generated keywords of the list 704 computed based on an affinity between each keyword of the list 704, and the trending topic "Chris Hadfield" according to one embodiment of the present disclosure. In one embodiment, a Euclidean technique or a Cosine technique is applied for computing the affinity. In computing the affinity using such techniques, two vectors may be created. A first vector may be constructed based on a number of occurrences 706 of each keyword of the list 704 in the content 702. A second vector may be constructed based on the trending topic "Chris Hadfield". Then, an affinity between each keyword of the list 704 and the trending topic "Chris Hadfield" is computed using these techniques which are known in the art. Examples of scores that are computed for each keyword of the list 704 based on the affinity are provided in the FIG. 9. However, techniques include a correlation technique, a Jaccard coefficient technique, and other techniques that are known in the art for computing similarity can be employed for computing scores. Threshold is computed based on the above mentioned equation, and one or more keywords (e.g., space, Bowie, and oddity) are qualified for generating an expanded query.

Figure 10:
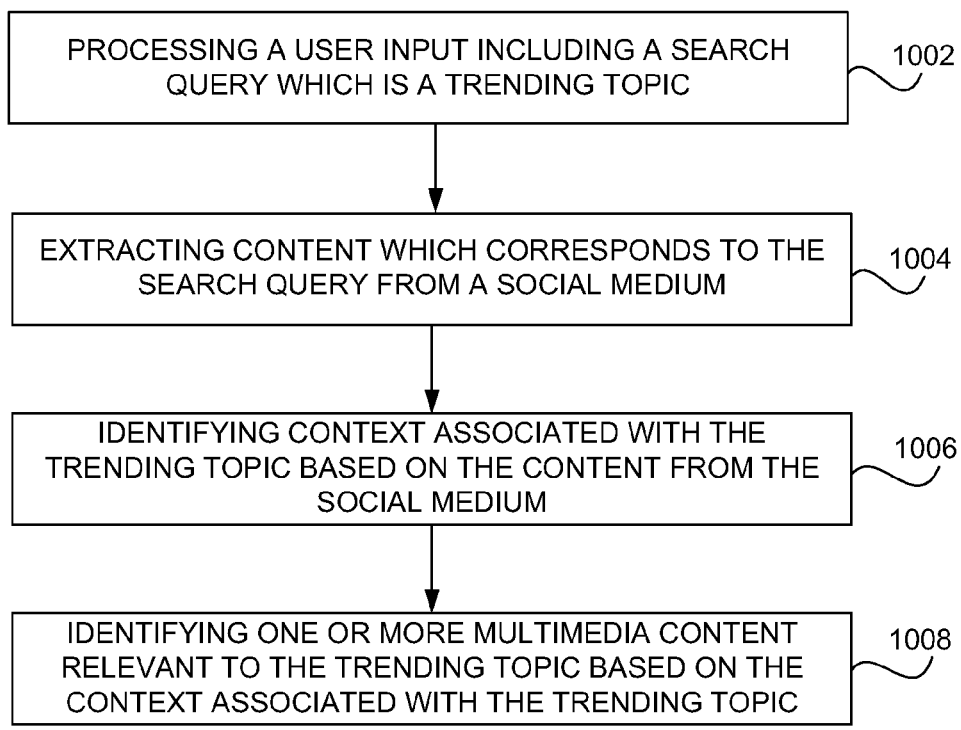
FIG. 10 is a flow chart illustrating a method for identifying one or more multimedia content relevant to a trending topic according to one embodiment of the present disclosure.

FIG. 10 is a flow chart illustrating a method for identifying one or more multimedia content relevant to a trending topic according to one embodiment of the present disclosure. In step 1002, a user input including a search query is processed. In one embodiment, the search query is itself the trending topic. In step 1004, content which corresponds to the search query is extracted from a social medium. In step 1006, a context associated with the trending topic is identified based on the content that is extracted from the social medium as described below. In step 1008, the one or more multimedia content relevant to the trending topic is identified based on the context associated with the trending topic.

The method further includes obtaining one or more generated keywords from the content of the social medium. The one or more generated keywords are prioritized to obtain one or more prioritized keywords based on a score associated with each keyword of the one or more generated keywords. The score may be computed based on at least one of a) a number of occurrences of each keyword in the content, and b) an affinity between each keyword occurring in the content and a topic of the content. One or more keywords which include the context associated with the trending topic are obtained from the one or more prioritized keywords. An expanded query may be generated with a) the search query, and b) the one or more keywords from the one or more prioritized keywords. Further, one or more multimedia content that is relevant to the trending topic is identified based on the expanded query.

Figure 11:
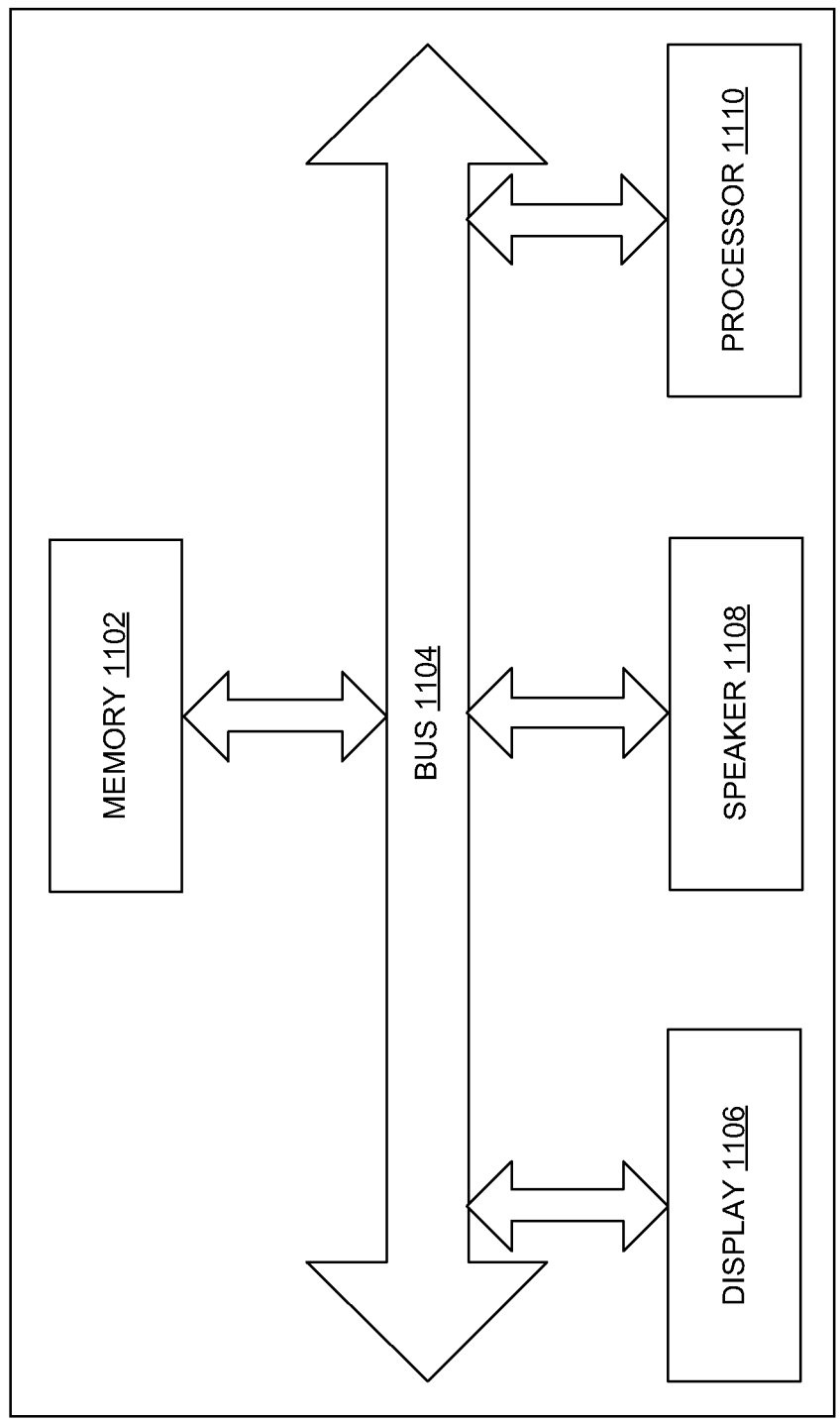
FIG. 11 illustrates an exploded view of a receiver used in accordance with the embodiments herein.

FIG. 11 illustrates an exploded view of a receiver of having an a memory 1102 having a set of computer instructions, a bus 1104, a display 1106, a speaker 1108, and a processor 1110 capable of processing a set of instructions to perform any one or more of the methodologies herein, according to an embodiment herein. The processor 1110 may also enable digital content to be consumed in the form of video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the receiver may view this stored information on display 1106 and select an item of for viewing, listening, or other uses via input, which may take the form of keypad, scroll, or other input device(s) or combinations thereof. When digital content is selected, the processor 1110 may pass information. The content and PSI/SI may be passed among functions within the receiver using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
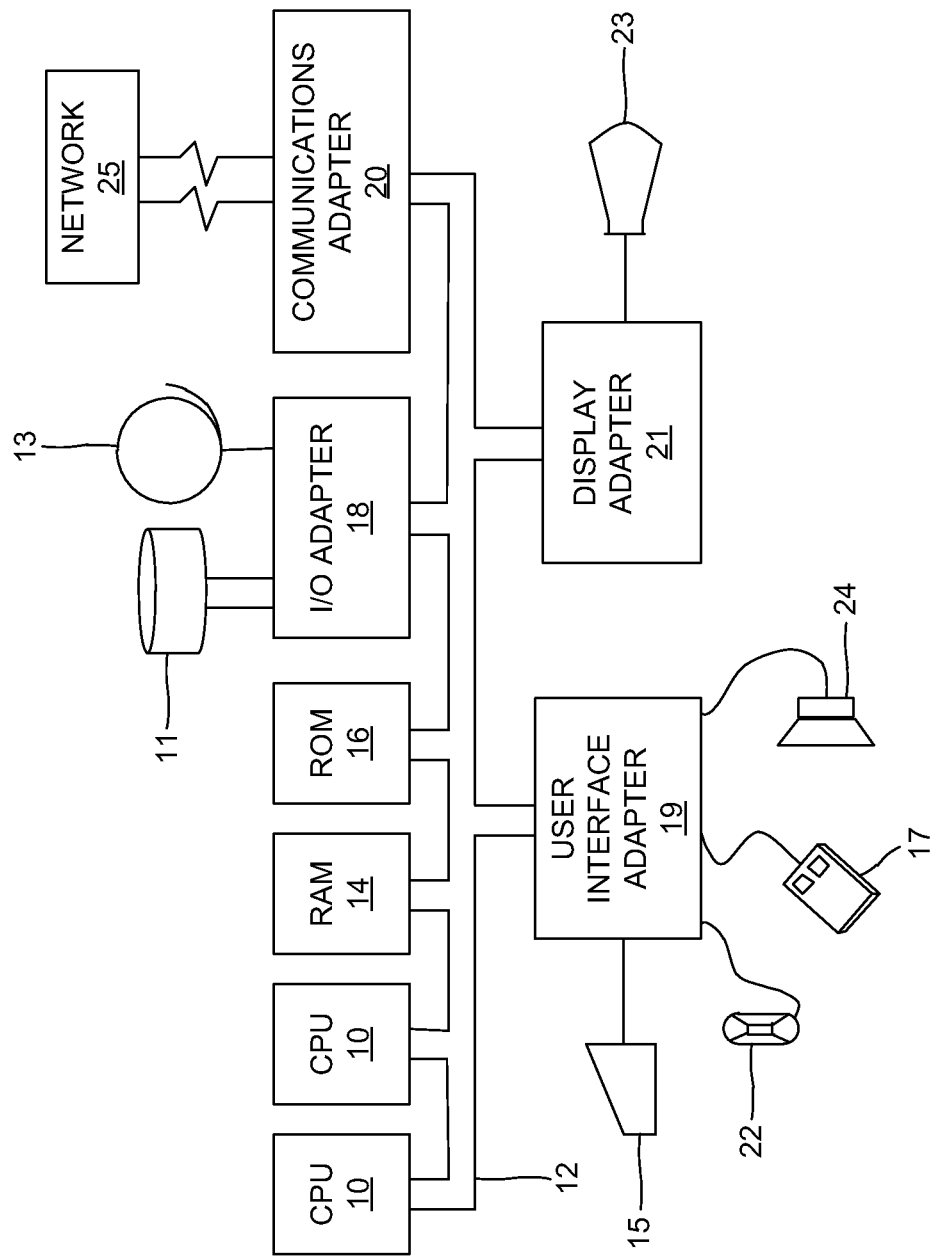
FIG. 12 illustrates a schematic diagram of a computer architecture used according to an embodiment herein.

A representative hardware environment for practicing the embodiments herein is depicted in FIG. 12. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The task management tool 106 allows creating a back-up of all the handwritten tasks. Further, synchronize the updated data and associated metadata on the task management server 112 periodically. The one or more tasks and task category can be shared with one or more user accounts. Further, combines the power of writing on a notepad with the enhancements possible because the data is stored in the digital format—e.g. communicating through email or any content communicating services.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for identifying at least one multimedia content relevant to a trending topic comprising:
    a display unit;
    a memory unit that stores a set of modules, and a database; and
        a hardware processor that executes the set of modules, wherein the set of modules comprises:
        (i) a query processing module executed by the processor and configured to process a user input comprising a search query, wherein the search query is the trending topic;
        (ii) a content extracting module executed by the processor and configured to extract a content which corresponds to the search query from a social medium; and
        (iii) a context extracting module comprising:
            (a) a keyword generating module executed by the processor and configured to obtain a plurality of generated keywords from the content; and
            (b) a keyword qualifying module executed by the processor and configured to obtains at least one keyword from the plurality of generated keywords, and wherein the keyword qualifying module comprises a keyword prioritizing module executed by the processor and configured to prioritize the plurality of generated keywords to obtain a plurality of prioritized keywords based on a score associated with each keyword of the plurality of generated keywords, and wherein said score is computed based on a) an affinity between each keyword occurring in the content and the trending topic, and b) a number of occurrences of each keyword in the content, and wherein the at least one keyword is obtained from the plurality of prioritized keywords, and wherein the keyword qualifying module is configured to quality one or more keywords from the one or more prioritized keywords based on a threshold value computed based on a preset equation, and wherein the threshold value is computed based on a mean number of occurrences of each keyword in the content and a standard deviation for number of occurrences of each keyword in the content in accordance with the preset equation, and wherein the preset equation is represented by threshold=mean+A*standard deviation, and wherein the mean is the mean number of occurrences of each keyword in the content and wherein standard deviation is the standard deviation for number of occurrences of each keyword in the content for number of occurrences of each keyword in the content and wherein A is an integer constant, and wherein a value of the integer constant A is adjusted to qualify a number of keywords; and
        (iv) a multimedia content identifying module executed by the processor that identifies the at least one multimedia content based on the at least one keyword from the plurality of generated keywords.

2. The system of claim 1, wherein the at least one keyword comprises a context associated with the trending topic.

3. The system of claim 1, wherein the set of modules further comprises a query generating module executed by the processor that generates an expanded query with a) the search query, and b) the at least one keyword from the plurality of generated keywords.

4. The system of claim 3, wherein the at least one multimedia content is identified based on the expanded query.

5. A method executed on a computing system for identifying at least one multimedia content relevant to a trending topic, said method comprises:
    processing a user input comprising a search query with a query processing module executed by the processor, wherein the search query is the trending topic;
    extracting a content which corresponds to the search query from a social medium with a content extracting module executed by the processor;
    identifying a context associated with the trending topic based on the content from the social medium with a context extracting module executed by the processor; and identifying the at least one multimedia content relevant to the trending topic based on the context associated with the trending topic with a multimedia content identifying module executed by the processor;

obtaining a plurality of generated keywords from the content with a keyword generating module; and obtaining at least one keyword from a plurality of prioritized keywords with a keyword qualifying module executed by the processor, and wherein the at least one keyword comprises the context associated with the trending topic, and wherein the plurality of prioritized keywords is obtained by prioritizing the plurality of generated keywords based on a score associated with each keyword of the plurality of generated keywords, wherein said score is computed based on a) an affinity between each keyword occurring in the content and the trending topic, and b) a number of occurrences of each keyword in the content;

qualifying one or more keywords from the one or more prioritized keywords using the keyword qualifying module based on a threshold value computed based on a preset equation, and wherein the threshold value is computed based on a mean number of occurrences of each keyword in the content, and a standard deviation for number of occurrences of each keyword in the content in accordance with the preset equation, and wherein the preset equation is represented by threshold=mean+A*standard deviation, and wherein the mean is the mean number of occurrences of each keyword in the content and wherein standard deviation is the standard deviation for number of occurrences of each keyword in the content for number of occurrences of each keyword in the content and wherein A is an integer constant, and wherein a value of the integer constant A is adjusted to qualify a number of keywords.

6. The method of claim 5, further comprises generating an expanded query with a) the search query, and b) the at least one keyword from the plurality of prioritized keywords.

7. The method of claim 6, wherein the at least one multimedia content is identified based on the expanded query.

8. A computer implemented method comprising instructions stored on a non-transitory computer readable storage medium and executed with a hardware processor on a computing device for identifying at least one multimedia content relevant to a trending topic, the method comprises the steps of:

processing a user input comprising a search query with a query processing module executed by the processor, wherein the search query is the trending topic;

extracting content which corresponds to the search query from a social medium with a content extracting module executed by the processor;

obtaining a plurality of generated keywords from the content with a keyword generating module executed by the processor;

prioritizing the plurality of generated keywords with a keyword prioritizing module executed by the processor to obtain a plurality of prioritized keywords based on a score associated with each keyword of the plurality of generated keywords, wherein said score is computed based on a) an affinity between each keyword occurring in the content and the trending topic, and b) a number of occurrences of each keyword in the content;

obtaining at least one keyword from the plurality of prioritized keywords with a keyword qualifying module executed by the processor; and identifying the at least one multimedia content relevant to the trending topic with a multimedia content identifying module executed by the processor based on the at least one keyword from the plurality of prioritized keywords; qualifying one or more keywords from the one or more prioritized keywords using the keyword qualifying module based on a threshold value computed based on a preset equation, and wherein the threshold value is computed based on a mean number of occurrences of each keyword in the content, and a standard deviation for number of occurrences of each keyword in the content in accordance with the preset equation, and wherein the preset equation is represented by threshold=mean+A*standard deviation, and wherein the mean is the mean number of occurrences of each keyword in the content and wherein standard deviation is the standard deviation for number of occurrences of each keyword in the content for number of occurrences of each keyword in the content and wherein A is an integer constant, and wherein a value of the integer constant A is adjusted to qualify a number of keywords;

generating an expanded query with a) the search query and b) the at least one keyword from the plurality of prioritized keywords;

wherein the at least one multimedia content is identified based on the expanded query.

9. The method of claim 8, wherein the at least one keyword comprises a context associated with the trending topic.

* * * * *